US011054055B2

(12) United States Patent
Sakautzky

(10) Patent No.: US 11,054,055 B2
(45) Date of Patent: Jul. 6, 2021

(54) ACTUATING DRIVE AND METHOD FOR OPERATING AN ACTUATING DRIVE

(71) Applicant: AUMA Riester GmbH & Co. KG, Mullheim (DE)

(72) Inventor: Arnd Sakautzky, Zimmern (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 0 days.

(21) Appl. No.: 16/389,003

(22) Filed: Apr. 19, 2019

(65) Prior Publication Data

US 2019/0323620 A1  Oct. 24, 2019

(30) Foreign Application Priority Data

Apr. 19, 2018  (DE) .......................... 102018109399.3

(51) Int. Cl.
| F16K 31/05 | (2006.01) |
|---|---|
| F16K 31/04 | (2006.01) |
| F16H 25/20 | (2006.01) |
| F16H 61/00 | (2006.01) |

(52) U.S. Cl.
CPC .......... *F16K 31/055* (2013.01); *F16K 31/046* (2013.01); *F16H 61/0006* (2013.01); *F16H 2025/2065* (2013.01); *F16H 2025/2071* (2013.01)

(58) Field of Classification Search
CPC ...... F16K 31/046; F16K 31/047; F16K 31/05; F16K 37/0083; F16H 61/0006; F16H 2025/2065; F16H 2025/2071

USPC .............. 251/129.01–129.05, 129.11–129.13
See application file for complete search history.

(56) References Cited

U.S. PATENT DOCUMENTS

| 3,309,942 | A | * | 3/1967 | Caldwell | ................. | F16H 37/00 |
|---|---|---|---|---|---|---|
| | | | | | | 74/625 |
| 4,050,000 | A | * | 9/1977 | Sutter | ..................... | F16K 31/05 |
| | | | | | | 318/468 |
| 4,406,999 | A | * | 9/1983 | Ward | ..................... | G01D 5/202 |
| | | | | | | 324/207.15 |
| 5,029,597 | A | * | 7/1991 | Leon | ..................... | F16K 31/046 |
| | | | | | | 137/1 |
| 6,003,837 | A | * | 12/1999 | Raymond, Jr. | ....... | F16K 31/055 |
| | | | | | | 251/129.12 |
| 6,084,370 | A | * | 7/2000 | Moller | .................... | F16K 31/05 |
| | | | | | | 251/129.11 |
| 6,371,440 | B1 | * | 4/2002 | Genga | .................. | F16K 31/046 |
| | | | | | | 251/129.03 |
| 8,267,374 | B2 | * | 9/2012 | Rho | ........................ | F16K 31/05 |
| | | | | | | 137/554 |

(Continued)

*Primary Examiner* — Matthew W Jellett
(74) *Attorney, Agent, or Firm* — Volpe Koenig

(57) ABSTRACT

An actuating drive (1) for actuating an actuator of a valve, with a motor drive unit (2) for the motorized actuation of the actuator and a manual drive element (3) for the manual actuation of the actuator, wherein an output shaft (13) of the actuating drive (1), which is displaced or can be displaced into an operative connection with the actuator, can be optionally actuated using the motor drive unit (2) or using the manual drive element (3). The actuating drive (1) includes at least one sensor (4, 8, 9, 10, 11), using which a rotational movement of the manual drive element (3) around a rotary axis (5) is detectable, in particular one that has been performed during the motor drive mode.

18 Claims, 2 Drawing Sheets

(56) References Cited

U.S. PATENT DOCUMENTS

| | | | |
|---|---|---|---|
| 8,342,478 B1* | 1/2013 | Cordray | F16K 37/0075 |
| | | | 137/554 |
| 9,212,473 B2* | 12/2015 | Baker | E03C 1/055 |
| 9,822,858 B2* | 11/2017 | Guerin | F16H 25/20 |
| 9,939,076 B2* | 4/2018 | Dolenti | F16K 37/0025 |

* cited by examiner

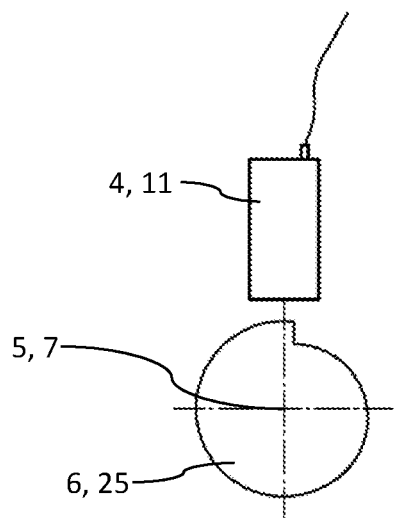
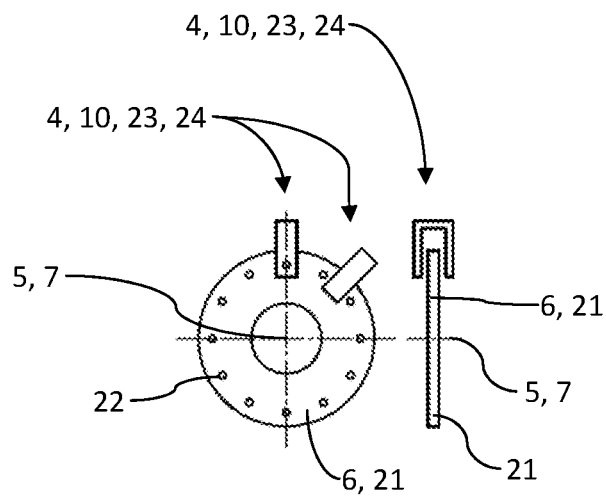
Fig. 2  Fig. 3A  Fig. 3B
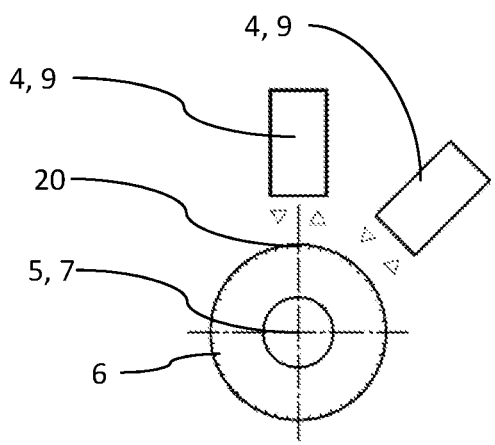
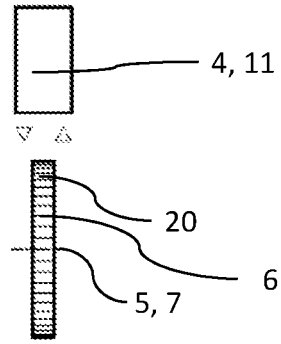
Fig. 4A  Fig. 4B
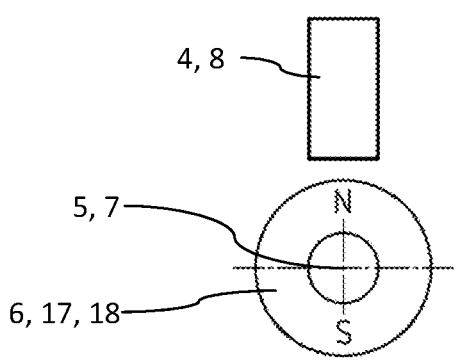
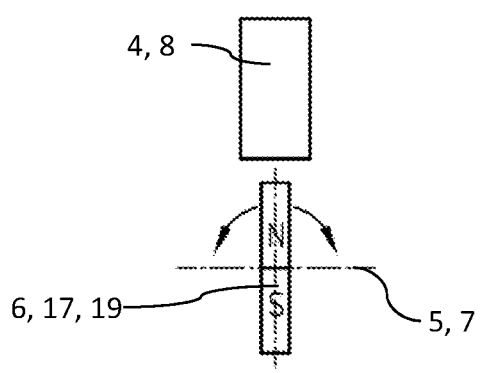
Fig. 5  Fig. 6

ACTUATING DRIVE AND METHOD FOR OPERATING AN ACTUATING DRIVE

INCORPORATION BY REFERENCE

The following documents are incorporated herein by reference as if fully set forth: German Patent Application No. DE 102018109399.3, filed Apr. 19, 2018.

BACKGROUND

The invention relates to an actuating drive with an output shaft for actuating a valve, with a motor drive unit and with a manual drive element, wherein the output shaft can be optionally actuated using of the motor drive unit or the manual drive element.

Furthermore, the invention relates to a method for the operation of an actuating drive for actuating a valve and to the use of a decoupled manual drive element of an actuating drive for operating the actuating drive.

Actuating drives of the aforementioned type are already known. They are generally constructed to adjust a valve between an open and a closure position. Under normal usage conditions, a valve actuation takes place by the motor drive unit. If, however, a power failure or another operational failure of the motor drive unit results, for example, the valve can alternatively be adjusted by manually actuating the manual drive element.

In the case of such actuating drives, the control of the motor drive unit takes place via keypads or the like, in particular input units designed as button-operated elements. By this, a user can input commands for controlling the valve on the actuating drive, which are then processed by a computer processing unit and passed on to the motor drive unit.

However, the use of keypads or similar button-operated elements is unfavorable since the manufacturing costs of an actuating drive are considerably increased as a result. In addition, they represent a risk for the desired impermeability of a housing of the actuating drive since they are integrated into the housing and/or are inserted into housing breakthroughs. This results in additional sealing elements being required in order to seal the housing to the tightest possible extent.

Another disadvantage of such actuating drives consists in the actuating drives being frequently used at relatively dust- and/or dirt-burdened locations. This can also result in the button-operated elements becoming dirty, which, in the worst case, can result in a defect of the button-operated elements and at least in the temporary failure of the actuating drive.

SUMMARY

Therefore, the object of the invention is to provide an actuating drive of the aforementioned type where the mentioned disadvantages do not occur.

In order to achieve this object, in the case of an actuating drive of the aforementioned type, one or more features according to the invention are provided. In particular, therefore, an actuating drive of the aforementioned type is proposed, which comprises at least one sensor, using which a rotational movement of the manual drive element around a rotary axis is detectable. By this detecting of the rotational movement, it is therefore possible to improve the operability of an actuating drive of the mentioned type and to simplify production. By detecting the rotational movement, it is namely possible to do without keypads and similar input elements for the most part or entirely, in particular for inputting control commands. Thus, by actuating the manual drive element, the user can input control commands for actuating the valve by the motor drive unit and does not need to do this anymore via touchpads. Consequently, a housing of the actuating drive can additionally be sealed in a simpler manner and failures, in particular due to a defect of the input elements caused by soiling can be more effectively avoided or prevented. In particular, for detecting the rotational movement, it can be provided that at least movements in two spatial axes are detectable by the at least one sensor. Preferably, one sensor can be respectively associated with each spatial axis for detecting a movement within a spatial axis. It can also be provided that a sensor can be provided for detecting the rotational movement and another sensor can be provided for detecting an axial movement.

Actuating drives are already known where an axial coupling movement of a manual drive element is detectable. However, due to the sensors provided for this purpose, it is not possible to detect a rotational movement of the manual drive element, in particular in order to detect a command input by the user from this and to pass this on to the motor drive unit. Up until this point, the detection of an axial coupling movement has only been used to be able to detect if a manual drive element is in a coupling position. This serves the purpose that no simultaneous propulsion can be carried out by the motor drive unit and the manual drive element, which under certain circumstances could lead to injury of a user caused by the manual drive element. Thus, if the manual drive element is in a coupling position, the motor drive unit is switched off or deactivated. Therefore, no unintended propulsion of the manual drive element can take place by the motor drive unit as long as the manual drive element is coupled.

In order to also be able to use an adjustment of the manual drive element in the axial direction to detect an input of the user, in accordance with a favorable development, it can be provided that an axial movement of the manual drive element along a longitudinal axis of the manual drive element can additionally be detected by the at least one sensor and/or by at least one other sensor. The detection of an axial movement of the manual drive element can, in particular, be interpreted as an input confirmation or acknowledgement.

Consequently, it may be particularly expedient to detect all degrees of freedom of the manual drive unit by the at least one sensor and to evaluate these to generate a command. Therefore, in particular, it can be provided that, by the at least one sensor, movements in three spatial axes are detectable. Preferably, thereby, at least one sensor can be respectively provided for detecting movement in each spatial axis.

In order to be able to detect a movement of the manual drive element in the most precise manner possible, an operative connection can be established between at least one detection element, which is formed on the manual drive element or is connected to the manual drive element, and the at least one sensor and/or a or the other sensor. A suitable operative connection can, for example, be an operative connection selected out of an inductive, optical and/or magnetic operative connection. The manual drive element can comprise a manual drive shaft or be connected to a manual drive shaft, which can be moved along therewith, in particular can be rotated along therewith, when actuating the manual drive element. Preferably, the detection elements is arranged on the manual drive shaft of the manual drive element so that the detection means can also be moved along therewith when actuating the manual drive element. It can be particularly expedient if the manual drive shaft, and particularly in the case of a magnetic operative connection, is made of a non-magnetic and/or non-magnetizable material.

In accordance with another favorable embodiment, the at least one sensor and/or a or the previously mentioned other sensor can be respectively configured to carry out a measurement type or a combination of a plurality of measurement types selected from the group of magnetic, optical and/or inductive measurement.

The at least one sensor and/or a or the previously mentioned other sensor can particularly preferably be designed respectively at least as a sensor selected from the group consisting of magnetic Hall sensor, phase-shifted reflex photoelectric sensors, phase-shifted forked photoelectric sensors and/or and inductive sensor. The use of a Hall sensor or an inductive sensor can have the advantage that soiling, in particular in the housing interior of the actuating drive, which, for example, can arise due to lubricant or the like, does not impair the detection of the movements of the manual drive element.

In particular, the design as a magnetic 3D Hall sensor can comprise particular advantages since it is possible in this way to detect all degrees of movement freedom of the manual drive element using a sensor.

In order to be able to convert a detected rotational movement of the manual drive element into a command, the at least one sensor and/or a or the previously mentioned other sensor can be coupled to a computer processing unit. Thereby, it can be particularly expedient if the at least one sensor and/or the other sensor is/are electronically coupled to a computer processing unit. By actuating the manual drive element, a command can be generated in this manner. In order to make a quick transfer and implementation of the command possible, the computer processing unit can be coupled, in particular electronically coupled, to the motor drive unit, wherein the motor drive unit can be controlled by the computer processing unit.

A command in terms of the invention can, for example, be a parameter setting and/or an adjustment command and/or a control command.

As has been previously stated, in order to avoid injuries of a user, it can be favorable if a coupling device is arranged between the manual drive element, in particular between a or the previously mentioned manual drive shaft, and an output shaft of the actuating drive. The coupling device can be designed as a mechanical coupling device. Preferably, the coupling device can be designed as a positive-locking coupling.

In order to be able to avoid an accidental faulty operation of the actuating drive by a user, in particular if the user would not like to operate the motor drive unit, but would like to perform a manual actuation of the valve using the manual drive element, in accordance with a particularly favorable embodiment it can be provided that a rotational movement of the manual drive element can only be detected by the at least one sensor if the manual drive element is decoupled and/or a command is generated from this. For example, this can be achieved by establishing a or the previously mentioned operative connection between the at least one sensor and the detection element only when the manual drive element is decoupled. Accordingly, it can therefore be provided that, in the coupled state of the manual drive element, no operative connection is established between the sensor and the detection element. The actuating drive is therefore in an operating mode only if the coupling device is in a decoupling position, in which operating mode a user can input commands.

In order to further simplify the operability of the actuating drive for a user, a movement of the manual drive element detected by the at least one sensor and/or a or the previously mentioned other sensor can be interpretable by a or the computer processing unit as a confirmation command for a selected or input command. Consequently, the user can confirm or acknowledge a previously made input by a movement of the manual drive element which is in particular predefined or definable. Thereby, it can be particularly favorable if this movement is an axial movement of the manual drive element along a longitudinal axis. Thereby, for example, it can be a movement which is performed during a coupling or decoupling process of the manual drive element.

In addition or as an alternative to this, in accordance with another possible embodiment, it can be provided that the actuating drive comprises another input unit, in particular at least one button, wherein a confirmation command for a selected or input command can be generated by actuating the input unit.

In accordance with a favorable embodiment of the invention, it can be provided that the manual drive element comprises at least one magnet as a or the previously mentioned detection element or is connected to at least one magnet, wherein a magnetic operative connection can be established or is established between the at least one magnet and the at least one sensor and/or the other sensor, via which a movement of the manual drive element is detectable, in particular a movement in the three spatial axes. Thereby, the magnet can be designed as a permanent magnet and/or an electromagnet. Preferably, the at least one magnet can be designed as a ring magnet and/or as a rod magnet. Therefore, at least one special magnetic Hall sensor, in particular a 3D Hall sensor, can be designed.

In accordance with another favorable embodiment of the invention, it can be provided that the manual drive element comprises at least one reflector as a or the previously mentioned detection element or is connected to at least one reflector. Preferably, the manual drive element comprises at least two reflectors shifted by a phase angle. An optical operative connection, designed as a photoelectric sensor, to a respective sensor can be established respectively via the reflector or the reflectors. Therefore, at least one special reflex photoelectric sensor, preferably two phase-shifted reflex photoelectric sensors, can be formed.

In accordance with another favorable embodiment of the invention, it can be provided that the manual drive element comprises at least one perforated disk with a plurality of openings arranged on a circular path as a or the previously mentioned detection element, wherein a light beam generated by at least one light source can be guided through the openings to at least one receiver for generating an optical operative connection, in particular if the perforated disk is twisted in such a way that there is an opening between the light source and the receiver. Therefore, at least one special forked photoelectric sensor, preferably two phase-shifted forked photoelectric sensors, can be formed.

In accordance with another favorable embodiment of the invention, it can be provided that the manual drive element comprises at least one conductor loop as a or the previously mentioned detection element. In particular, the conductor loop can be designed as a level spiral, meaning an Archimedean spiral. Therefore, an inductive operative connection can be established or capable of being established between the sensor and the conductor loop.

So that a user can muster the required force during a manual actuation process of the valve and/or in order to make the manual actuation process of the valve easier for the user, a gearbox can be arranged between a or the previously mentioned output shaft of the actuating drive and the manual drive element. Therefore, by this gearbox, a force exerted by a user on the manual drive element and/or an exerted torque can be transmitted and transferred to the output shaft.

In order nevertheless to make a simple and reliable input of commands possible by the manual drive element, the at least one sensor and/or a or the at least one detection element can be arranged between the gearbox and the manual drive element.

Actuating drives generally comprise a multitude of relatively quickly moving parts, which can lead to a high risk of injury and a considerable noise impact for a user or people standing in proximity. Therefore, the majority of the components of an actuating drive are covered by a housing. Furthermore, the influence of dirt, moisture and dust on the components arranged in it can be reduced by the housing. In order to reduce the production costs of a housing, it is generally attempted to form as few openings and/or breakthroughs as possible on the housing, which must namely generally be sealed in a relatively elaborate manner. Therefore, in accordance with another favorable development, it can be provided that the actuating drive comprises a housing, wherein a housing opening due to an operating element is only provided for the manual drive element and/or a or the previously mentioned other input unit. This has the advantage that a number of housing openings provided for operating elements of the actuating drive can be considerably reduced with respect to previously known actuating drives, which reduces the number of openings overall, therefore also reducing the manufacturing costs as well as simplifying the sealability of the housing.

So that a user can feel how far the manual drive element has been adjusted, particularly in the operating mode, in accordance with another favorable development, it can be provided that the actuating drive comprises a snap-in locking device, by which a movement of the manual drive element is detectable in a haptic manner, especially in a stepwise manner, for a user. Preferably, the snap-in locking device can comprise spring-loaded pressure elements, which are, for example, arranged at regular distances on a circular path. In particular, the pressure elements can be designed as balls and/or cylinders and/or cones.

In order to make the actuation of the manual drive element as simple as possible, it can be designed as a hand wheel.

In accordance with another favorable embodiment, the sensor can be arranged within a or the previously mentioned housing of the actuating drive. This has the advantage that no cable breakthrough in the housing for connecting the sensor is required. Therefore, an even simpler and better sealing of the housing can be achieved.

In addition or as an alternative to this, it can furthermore be provided that the manual drive element is arranged outside of a or of the housing of the actuating drive.

In order to be able to better avoid faulty operation of the actuating drive, in accordance with another favorable embodiment of the actuating drive, a or the previously mentioned at least one detection element can be in a detection region of the sensor in a decoupled state of the manual drive element. In particular, consequently, in the decoupled state of the manual drive element, one or the previously mentioned operative connection between the sensor and the detection element can be established. In a coupled state of the manual drive element, in contrast, a or the previously mentioned at least one detection element can be outside of the detection region of the at least one sensor. In particular, this means that an operative connection between the sensor and the detection element can be eliminated in the coupled state of the manual drive element, in particular meaning that no operative connection is established.

The aforementioned object can be furthermore achieved by using one or more features related to the method. In particular, a method of the aforementioned type is provided here, wherein a rotational movement of a manual drive element is detected, in particular detected by a sensor, for carrying out a command, wherein the manual drive element is additionally provided for transmitting an actuating force to an output shaft and/or the valve.

The method according to the invention is particularly suitable for operating an actuating drive as described and claimed herein. For this reason, all features disclosed herein with reference to the actuating drive can also be applied to the method.

In accordance with a favorable development of the method, it can be provided that no power transmission from the manual drive element to an output shaft of the actuating drive is possible when inputting a command. As has already been stated with reference to the actuating drive, by this, the risk of injury for a user and risk of faulty operation of the actuating drive can be reduced.

In addition or as an alternative to this, it can be provided that no input of a command is possible during the power transmission from the manual drive element to the output shaft of the actuating drive. A situation can thus be prevented in which commands are input in an undesired manner, while in principle only manual actuation of the valve is intended to be carried out.

In order to achieve the aforementioned object, a use of a decoupled manual drive element of an actuating drive, in particular of the actuating drive as described and claimed herein, is additionally proposed for operating the actuating drive, wherein the manual drive element is additionally provided for transmitting an actuating force to an output shaft and/or the valve.

Thus, the invention relates to an actuating drive for actuating an actuator of a valve, with a motor drive unit for the motorized actuation of the actuator and a manual drive element for the manual actuation of the actuator, wherein an output shaft of the actuating drive, which is displaced or can be displaced into an operative connection with the actuator, can be optionally actuated using the motor drive unit or the manual drive element, and wherein the actuating drive comprises at least one sensor, using which a rotational movement of the manual drive element around a rotary axis is detectable, in particular one that has been performed during the motor drive mode.

BRIEF DESCRIPTION OF THE DRAWINGS

In the following, a plurality of exemplary embodiments of the invention are described in more detail based on the figures. However, the invention is not limited to these exemplary embodiments. Other exemplary embodiments result from the combination of the features of individual or a plurality of claims among each other and/or with individual or a plurality of features of the exemplary embodiments.

As very schematic illustrations in part, the figures show.

DETAILED DESCRIPTION

Figure 1:
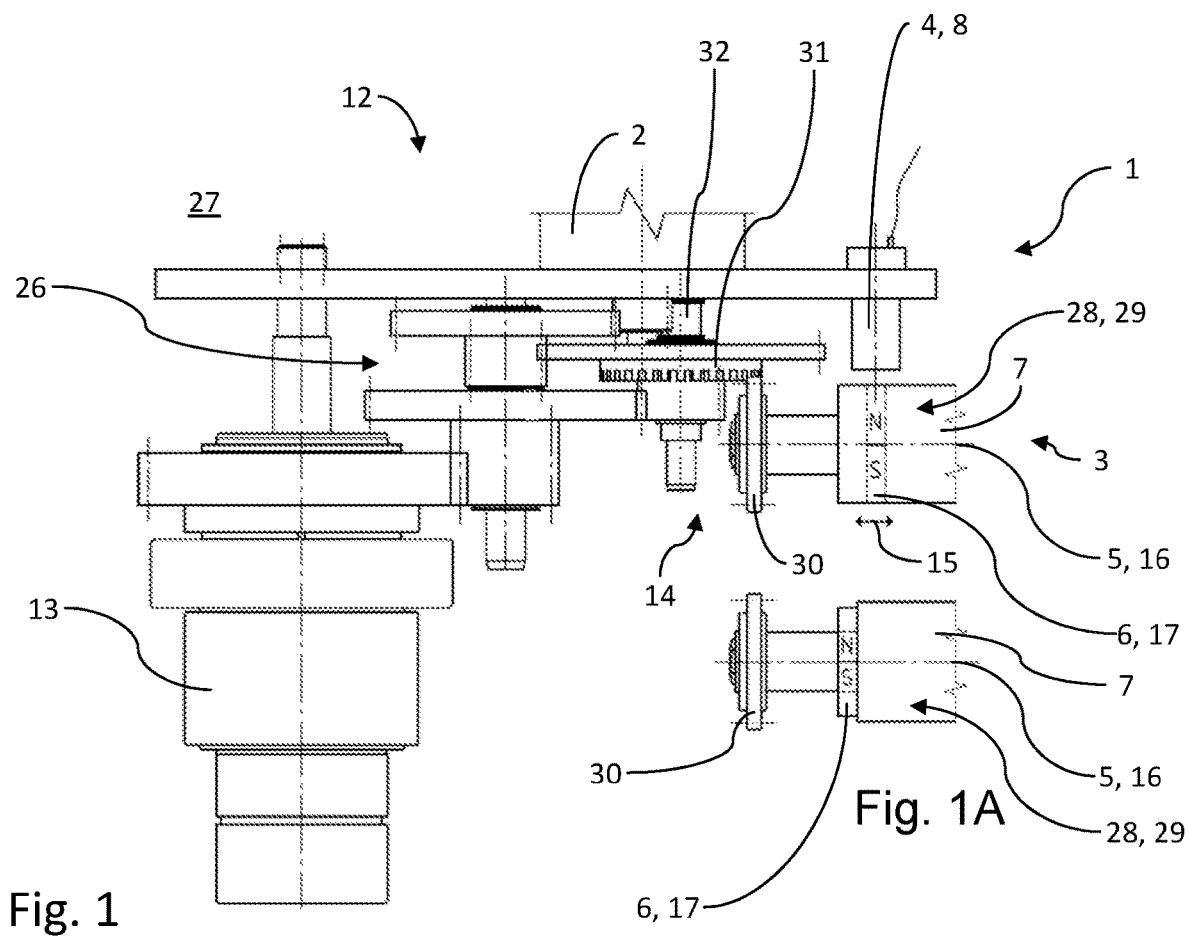
FIG. 1 a front view of a possible exemplary embodiment of an actuating drive with a magnetic 3D Hall sensor for detecting a rotational movement of a manual drive shaft of a manual drive element, wherein the manual drive element is decoupled, however, in respect thereof, an operative connection exists between the sensor and the detection element, wherein the detection element is designed as a rod magnet, FIG. 1A the manual drive element from FIG. 1, wherein the detection element here is designed as a ring magnet, FIG. 2 a front view of a possible embodiment of an inductive sensor and of the related detection element designed as a spiral-shaped conductor loop, which is arranged on the manual drive shaft of the manual drive element, FIG. 3A a front view of a possible embodiment of an optical sensor and of the related detection element, which is designed as a circular perforated disk with a multitude of openings arranged at regular intervals on a circular path and is arranged on the manual drive shaft of the manual drive element, FIG. 3B a lateral view of the optical sensor and of the related detection element from FIG. 3A, FIG. 4A a front view of another possible embodiment of an optical sensor and the related detection elements, which are respectively designed as reflectors and are arranged at regular intervals on a circular disk arranged on the manual drive shaft, FIG. 4B a lateral view of the optical sensor and of the related detection element from FIG. 4A, FIG. 5 a front view of a possible embodiment of a magnetic sensor, which is designed as a 3D Hall sensor, and of the related detection element, which is designed as a ring magnet and is arranged on the manual drive shaft, and FIG. 6 a front view of another possible embodiment of a magnetic sensor, which is designed as a 3D Hall sensor, and of the related detection element, which is designed as a rod magnet and is arranged on the manual drive shaft.

In FIG. 1, an actuating drive for actuating a valve, identified as a whole with 1, is shown. By use of the actuating drive 1, a valve can be moved between an open and a closure position.

The actuating drive 1 additionally comprises a motor drive unit 2, by which a motorized adjustment of an actuator of the valve can be carried out. In addition, an operative connection must be established between the actuating drive 1 and the actuator of the valve. The motor drive unit 2 can, for example, be designed as an electric motor. The actuating drive furthermore comprises a manual drive element 3, which can be alternatively used for actuating the valve instead of the motor drive unit 2.

Furthermore, the actuating drive 1 comprises at least one sensor 4, with which a rotational movement of the manual drive element is detectable. The manual drive element 3 comprises a manual drive shaft 7, which is connected to a detection element 6, and/or on which manual drive shaft 7 a detection element 6 is arranged.

In addition to the previously mentioned rotational movement of the manual drive element 3, by the sensor 4 and/or by another sensor 4, a movement of the manual drive element 3 in the axial direction 15 along a longitudinal axis 16 of the manual drive element 3 and/or the manual drive shaft 7 can be detected. Consequently, by the sensor 4 and/or by the other sensor 4, movements in all three spatial axes (X, Y, Z) are detectable.

However, it can also be provided that, for every spatial axis, a sensor is respectively associated for detecting a movement. It can also be provided that a sensor 4 is provided for detecting the rotational movement and another sensor 4 is provided for detecting the axial movement.

In the embodiment shown in FIGS. 1, 1A, 5 and 6, the previously mentioned detection element 6 is respectively designed as a magnet 17 and the sensor 4 is designed as a magnetic 3D Hall sensor 8. By this embodiment of the sensor 4 as a magnetic 3D Hall sensor 8, it is possible to detect movements in all three spatial axes by a single sensor 4.

In addition or as an alternative to the embodiment in accordance with FIGS. 1, 1A, 5 and 6, the actuating drive 1 can also comprise other sensor types, such as at least one optical sensor 9, 10 (cf. FIGS. 3A, 3B, 4A and 4B) and/or an inductive sensor 11 (cf. FIG. 2), for example. The examples of these other sensor types from FIGS. 2 to 6 are described in the following more precisely. However, the invention is not limited to these sensor types.

However, in general, it can be said that an operative connection is set up between the sensor 4 and the detection element 6 respectively. This operative connection can thus relate to a magnetic, optical and/or inductive operative connection. By the established operative connection, movements of the manual drive element can be detected by the respective sensor 4 and be interpreted into a command by a computer processing unit 12.

In the case of a movement of the manual drive element 3, the at least one detection element 6 is moved along with the manual drive shaft 7. In the case of using a magnetic sensor 4, it is expedient if the manual drive shaft 7 is made of a non-magnetic and/or non-magnetizable material so that no interference in the detection of the movements by the sensor 4, 8 results.

A user can therefore input commands, for example for controlling the motor drive unit 2, and/or input parameters by actuating the manual drive element 3. An acknowledgement or confirmation of the input commands can thereby then take place by a predefined movement, preferably by an axial movement 15, of the manual drive element 3. Thereby, it can also be provided that the actuating drive 1 comprises a display unit, by which an input field and/or a selection menu is/are displayable, which can be operated via the manual drive element 3 and/or into which values can be thus input.

The magnet 17 can, as is shown in FIG. 5, be designed as a ring magnet 18 and/or, as is shown in FIG. 6, be designed as a rod magnet 19. Preferably, the magnet 17 is a permanent magnet.

The actuating drive 1 comprises a coupling device 14, which is arranged between an output shaft 13 of the actuating drive 1 and the manual drive shaft 7. The coupling device 14 can, for example, be designed in a mechanical manner. A possible embodiment of a coupling device 14 is shown in FIGS. 1 and 1A. Here, it is a positive-locking coupling device 14 with a spur wheel 30, which spur wheel 30 is connected to the manual drive shaft 7 and has an operative connection to a crown wheel 31 in the coupled state, wherein the crown wheel 31 is connected to a motor shaft 32. The motor shaft 32 can be driven by the motor drive unit 2. Via the gearbox 26, power transmission from the motor shaft 32 to the output shaft 13 can take place. By actuating the manual drive element 3 in the coupled state of the coupling device 14, it is therefore possible to perform a torque and/or power transmission from the manual drive element 3 to the output shaft 13. The output shaft 13 can furthermore be driven by the motor drive unit 2 in the decoupled state (cf. FIG. 1). In this case however, no operative connection between the spur wheel 30 and the crown wheel 31 exists, and so the manual drive element 3 cannot be driven along therewith via the motor drive unit 2 during motor operation. The output shaft 13 of the actuating drive 1 can be brought into an operative connection with the valve, in particular with an actuator of the valve or is in such an operative connection with the valve so that the valve, in particular the actuator of the valve, can be adjusted between an open and a closure position by the actuating drive 1.

It can therefore generally be said that, in a decoupled state of the manual drive element 3, the at least one detection element 6 is arranged within a detection region of the sensor 4 so that, in this state, the operative connection between the sensor 4 and the detection element 6 is established. In contrast to this, in a coupled state of the manual drive element 3, the at least one detection element 6 is arranged outside of the detection region of the sensor 4 so that, in this state, the operative connection between the sensor 4 and the detection element 6 has been eliminated.

A gearbox 26 is arranged between the output shaft 13 and the manual drive shaft 7. A power transmission from the motor drive unit 2 and/or from the manual drive element 3 to the output shaft 13 is possible by the gearbox 26. Therefore, a user can adjust the valve more simply due to the gearbox 26 via a lower level of force exertion than without using a gearbox 26 by the manual drive unit.

The actuating drive 1 additionally comprises a housing 27, in which the motor drive unit 2, the sensor 4, the gearbox 26, at least partially the output shaft 13, the coupling device 14, as well as at least partially the manual drive shaft 7 are housed. The housing 27 comprises only one opening due to an input element in order to guide the manual drive shaft 7 towards the outside. Therefore, the manual drive element 3 is arranged outside of the housing 27. This makes it possible to seal the housing 27 in a relatively simple and effective way since the smallest possible number of openings provided for this can be implemented with respect to the input elements in comparison to previously known actuating drives with keypads or the like.

In FIG. 1A, the manual drive shaft 7 is shown in a coupled state so that a force and/or torque transmission from the manual drive element 3 to the output shaft 13 is possible. The manual drive element 3 can be adjusted between a coupled position and a decoupled position of the coupling device 14 by an axial movement 15 of the manual drive element 3 along the longitudinal axis 16. Since the detection element 6 is adjusted together with the manual drive shaft relative to the sensor 4, 8 in the axial direction 15, in the coupled state of the manual drive element 3, the operative connection between the sensor 4 and the detection element 6 is eliminated. In this position, detection of the rotational movement of the manual drive element is no longer possible by the sensor 4. It can therefore generally be said that the detection element 6 is adjustable in its position relative to the sensor 4.

In FIG. 2, an inductive sensor 4 with a related detection element 6 designed as a conductor loop 25 is shown. The detection element 6 can be designed here as a level spiral, for example.

In FIGS. 3A and 3B, an optical sensor 4 is shown, which is designed as a forked photoelectric sensor 10. For this purpose, the stationary sensor 4 comprises a light source 23 and a receiver 24. The light source 23 and the receiver 24 are separated from each other by a detection element 6 designed as a perforated disk 21. The perforated disk 21 comprises a plurality of openings designed as holes 22, by which a photoelectric sensor can be formed between the light source 23 and the receiver 24. In the case of a rotational movement of the manual drive element 3, therefore, the perforated disk 21 arranged on the manual drive shaft 7 is rotated along therewith, which is made possible for a phased design of a photoelectric sensor by the openings 22 arranged on a circular path at regular intervals to one another. The embodiment in FIGS. 3A and 3B therefore comprises two sensors 4 that are phase-shifted with respect to one another in order to be able to detect the rotational movement of the manual drive element 3 more precisely. Therefore, it can be provided that the design of a photoelectric sensor is only possible by one of the two sensors 4 respectively since an angle between the individual openings 22 of the perforated disk 21 is not equal to an angle between the two sensors 4 of the embodiment in FIGS. 3A and 3B.

In FIGS. 4A and 4B, another possible embodiment of an optical sensor 4 is shown, wherein, here, two phase-shifted sensors 4 that are however designed as reflex photoelectric sensors 9 in this case, are also provided. This embodiment comprises a plurality of detection elements 6 designed as reflectors 20, which are arranged in a circumferential manner on a shell surface of a base body, in particular a cylinder, at regular intervals to one another.

In order to make a haptic detection of a rotational movement performed by a user on the manual drive element 3 possible for said user, the actuating drive comprises a snap-in locking device 28 with a plurality of pressure elements 29 that yield to pressure. By this snap-in locking device 28, a plurality of snap-in positions can be defined. In order to be able to move the manual drive element 3 out of a snap-in position, a level of force higher than a sum of the lock-in forces generated by the pressure elements 29 must thus be exerted. Thereby, the pressure elements 29 can be spring-loaded. Furthermore, they can be designed as balls and/or cylinders and/or cones, for example. The pressure elements 29 can furthermore be arranged on a circular path at regular intervals to one another, wherein the distance between two snap-in positions can be defined by a distance between two adjacent pressure elements.

Due to the actuating drive 1, the possibility is thus created to not use a manual drive element 3 alone for manually adjusting a valve, but to also additionally set up the manual drive element 3 as an operating element to control the actuating drive 1. In this way, it is possible to transfer a function, which is usually taken on by keypads, key elements or such input elements, to a previously existing component of an actuating drive 1.

Thereby, it particularly favorable if the generation of a command by a manual drive element 3 is only possible in a decoupled position of the coupling device 14, wherein, thereby, the manual drive element 3 and/or the computer processing unit 12 transfers into an operating mode. That means that the manual drive element 3 in its coupled state is preferably only set up for transmitting a force or a torque to the output shaft 13. A situation can thus be prevented in which commands are input by a user unintentionally while the manual drive element 3 is in the coupled state, i.e. in a drive mode.

The invention relates to an actuating drive 1 for actuating an actuator of a valve, with a motor drive unit 2 for the motorized actuation of the actuator and a manual drive element 3 for manual actuation of the actuator, wherein an output shaft 13 of the actuating drive 1, which is displaced or can be displaced into an operative connection with the actuator, can be optionally actuated using the motor drive unit 2 or using the manual drive element 3, and wherein the actuating drive 1 comprises at least one sensor 4, using which a rotational movement of the manual drive element 3 around a rotary axis 5 is detectable, in particular one that has been performed during the motor drive mode.

REFERENCE LIST 1 actuating drive
2 motor drive unit
3 manual drive element
4 sensor
5 rotary axis
6 detection element
7 manual drive shaft
8 magnetic 3D Hall sensor
9 reflex photoelectric sensor (optical sensor)
10 forked photoelectric sensor (optical sensor)
11 inductive sensor
12 computer processing unit
13 output shaft
14 coupling device
15 axial movement
16 longitudinal axis
17 magnet
18 ring magnet
19 rod magnet
20 reflector
21 perforated disk
22 hole/opening
23 light source
24 receiver
25 conductor loop
26 gearbox
27 housing
28 snap-in locking device
29 pressure element
30 spur wheel
31 crown wheel
32 motor shaft

The invention claimed is:

1. An actuating drive (1), comprising:
an output shaft (13) for actuating a valve,
a motor drive unit (2) and an axially movable and rotatable manual drive element (3),
wherein the output shaft (13) is optionally actuatable using the motor drive unit (2) or the manual drive element (3),
at least one sensor (4) configured to detect a rotational movement of the manual drive element (3) around a rotary axis (5), and
the at least one sensor (4) or an other sensor is configured to detect an axial movement (15) of the manual drive element (3) along a longitudinal axis (16) of the manual drive element (3), or the at least one sensor (4) is configured to detect movements in three spatial axes, or the at least one sensor (4) is configured to detect the axial movement (15) of the manual drive element (3) and to detect movements in three spatial axes.

2. The actuating drive (1) as claimed in claim 1, wherein the at least one sensor (4) comprises a respective sensor configured to detect movement in each of said three spatial axes.

3. The actuating drive (1) as claimed in claim 1, further comprising an operative connection established between the at least one sensor (4), the other sensor (4), or the at least one sensor and the other sensor and at least one detection element (6) formed on or connected to the manual drive element (3), and the at least one detection element (6) is arranged on an at least one of non-magnetic or non-magnetizable manual drive shaft (7) of the manual drive element (3).

4. The actuating drive (1) as claimed in claim 3, wherein the operative connection is selected from at least one of an inductive, optical or magnetic operative connection, and during a movement of the manual drive element (3), the at least one detection element (6) is moved along therewith.

5. The actuating drive (1) as claimed in claim 1, wherein at least one of the at least one sensor (4) or the other sensor (4) is respectively set up to carry out a measurement type or a combination of a plurality of measurement types selected from the group including at least one of magnetic, optical, or inductive measurement, and at least one of the at least one sensor (4) or the other sensor (4) comprises at least one of a magnetic Hall sensor, phase-shifted reflex photoelectric sensors (9), phase-shifted forked photoelectric sensors (10), or inductive sensor (11).

6. The actuating drive (1) as claimed in claim 1, wherein at least one of the at least one sensor (4) or the other sensor (4) is coupled to a computer processing unit (12) wherein, by actuating the manual drive element (3), a command is generated to control the motor drive unit (2) by the computer processing unit (12).

7. The actuating drive (1) as claimed in claim 1, further comprising a coupling device (14) arranged between the manual drive element (3) and an output shaft (13) of the actuating drive (1), and a rotational movement of the manual drive element (3) is only detectable by the at least one sensor (4) in the case of a decoupled manual drive element (3) or by a command generated from the at least one sensor (4).

8. The actuating drive (1) as claimed in claim 1, wherein an axial movement of the manual drive element (3) detected by at least one of the at least one sensor (4) or the other sensor (4) is interpreted by a computer processing unit (12) as a confirmation command for a command that has been input or selected by a rotational movement, or the actuating drive (1) comprises an input unit, and a confirmation command for a command that has been input or selected by a rotational movement is generated due to actuation of the input unit.

9. The actuating drive (1) as claimed in claim 1, wherein the manual drive element (3) comprises at least one magnet (17) as a detection element (6) or is connected to at least one magnet (17), and a magnetic operative connection is establishable or is established between the at least one magnet (17) and at least one of the at least one sensor (4) or the other sensor (4), via which a movement of the manual drive element (3) is detectable, and the at least one magnet (17) comprises at least one of a ring magnet (18) or as a rod magnet (19).

10. The actuating drive (1) as claimed in claim 1, wherein the manual drive element (3) comprises at least one reflector (20) as a detection element (6) or is connected to at least one reflector (20) via which an optical operative connection which comprises a photoelectric sensor is establishable or established to a respective sensor (4).

11. The actuating drive (1) as claimed in claim 1, wherein the manual drive element (7) comprises at least one perforated disk (21) as a detection element (6) having a plurality of openings (22) arranged on a circular path, and a light beam generated by at least one light source (23) is guidable or guided through the openings (22) to at least one receiver (24) to form an optical operative connection.

12. The actuating drive (1) as claimed in claim 1, wherein the manual drive element (3) comprises at least one conductor loop (25) as a detection element (6), and an inductive operative connection is formed between the sensor (4) and the conductor loop (25).

13. The actuating drive (1) as claimed in claim 1, further comprising a gearbox (26) arranged between the output shaft (13) of the actuating drive (1) and the manual drive element (3), and at least one of the at least one sensor (4) or at least one detection element (6) is arranged between the gearbox (26) and the manual drive element (7).

14. The actuating drive (1) as claimed in claim 1, further comprising a snap-in locking device (28), by which a movement of the manual drive element (3) is detectable in a haptic manner, the snap-in locking device (28) comprises spring-loaded pressure elements (29), and the manual drive element (3) comprises a hand wheel.

15. The actuating drive (1) as claimed in claim 1, further comprising a housing (27), the at least one sensor (4) is arranged within the housing (27) or the manual drive element (3) is arranged outside of the housing (27), or the at least one sensor (4) is arranged within the housing (27) and the manual drive element (3) is arranged outside of the housing (27).

16. The actuating drive (1) as claimed in claim 1, wherein, in a decoupled state of the manual drive element (3), at least one detection element (6) is in a detection region of the at least one sensor (4), and in this state, an operative connection is established between the at least one sensor (4) and the detection element (6) and, in a coupled state of the manual drive element (3), the at least one detection element (6) is outside of the detection region of the sensor (4), eliminating the operative connection between the at least one sensor (4) and the detection element (6).

17. A method for the operation of an actuating drive (1) for actuating a valve, the method comprising:
   detecting a rotational movement and an axial movement of a manual drive element (3) using a sensor (4),
   carrying out a command based on the sensor (4),
   the manual drive element (3) transmitting an actuating force to at least one of an output shaft (13) or the valve, and
   wherein no power transmission from the manual drive element (3) to the output shaft (13) of the actuating drive (1) is possible during an input of the command, or no input of the command is possible during the power transmission from the manual drive element (3) to the output shaft (13) of the actuating drive (1), or both.

18. The method as claimed in claim 17, wherein the manual drive element (3) for the actuating drive (1) is decouplable.

* * * * *